UNITED STATES PATENT OFFICE.

JAMES O. WALSH, OF NEW YORK, N. Y., AND ARTHUR C. AUSTIN, OF HASBROUCK HEIGHTS, NEW JERSEY, ASSIGNORS TO SAID WALSH, OF NEW YORK, N. Y.

BANANA FOOD PRODUCT.

1,090,255. Specification of Letters Patent. Patented Mar. 17, 1914.

No Drawing. Application filed March 12, 1913. Serial No. 753,656.

*To all whom it may concern:*

Be it known that we, JAMES O. WALSH, of the city, county, and State of New York, and ARTHUR C. AUSTIN, of Hasbrouck Heights, Bergen county, New Jersey, have invented a new and useful Improvement in Banana Food Products, of which the following is a full, clear, and exact description.

Our invention relates to improvements in a food product in which bananas are used as the base, and in which the banana flavor is retained.

The object of our invention is to produce a wholesome, palatable, and easily digestible food product, which is thoroughly dry and hard so that it can be conveniently and safely packed and shipped, and which can be easily and tastefully served in the form of food, retaining the banana flavor through its different processes of manufacture.

In producing this food product we use banana pulp which is first mixed with about an equal quantity of a suitable digestible absorbent, and we have found ground rice to be the best absorbent for this purpose because this has no strong flavor of its own, and it mingles with the banana pulp so that the banana flavor predominates and gives to the ultimate product the desired banana taste. However, other grain flours can be used if desired without affecting the invention. After the absorbent and banana are mingled, the mass is cooked preferably in a steam cooker, is flavored with an additional amount of pure banana flavoring so as to compensate for the addition of the absorbent and for the loss of any flavor while being steamed, and the ingredients are more thoroughly incorporated preferably by pounding as in a mortar, which produces a smooth glutinous mass. The cooking should be continued for about thirty minutes. After the mass is cooked, it is laid out in bulk to temper, and after about forty-eight hours it assumes a consistency about like ordinary cheese. The mass is then cut into slices or small blocks. If cut into blocks, these are thoroughly dried, and then put in a hot oven for about three minutes, when they will puff up, and will be crisp, absorbent, and ready for use. They will be hard and dry, however, but will readily assimilate with suitable sauces, or they can be eaten dry if preferred. Instead of cutting into blocks, the mass may be rolled out into thin strips of about the thickness of paper, preferably thin paper, and these strips are dried for about an hour, then subjected to intense heat for about thirty seconds, which produces a crisp flake, and this can be broken up as desired. The flake is ready to serve, and is used to best advantage with some sauce, such as cream or the like.

The flaked material has the appearance of some of the ordinary flaked cereals, while the material when cut into blocks and heated as described, has the appearance of some of the so-called puffed foods, like puffed rice. In either case, however, it retains the full flavor of the banana.

We claim:—

1. As an improved article of manufacture, a cooked food formed of a banana pulp and a digestible absorbent, the materials being combined, dried, cooked and divided.

2. An improved cooked food product in the form of dry hard particles formed of banana pulp and a ground absorbent.

3. An improved cooked food in the form of dry, hard puffed particles made from banana pulp and a digestible absorbent, the mass being cooked, separated, and puffed as specified.

JAMES O. WALSH.
ARTHUR C. AUSTIN.

Witnesses:
WARREN B. HUTCHINSON,
M. G. O'DONNELL.